(12) United States Patent
Maeshima (10) Patent No.: US 8,693,299 B2
(45) Date of Patent: Apr. 8, 2014

(54) MEDIA PROCESSING SYSTEM, CONTROL METHOD FOR MEDIA PROCESSING SYSTEM, AND MEDIA PROCESSING DEVICE

(75) Inventor: Hidetoshi Maeshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 8 days.

(21) Appl. No.: 13/419,842

(22) Filed: Mar. 14, 2012

(65) Prior Publication Data

US 2012/0236700 A1 Sep. 20, 2012

(30) Foreign Application Priority Data

Mar. 14, 2011 (JP) ................................. 2011-055600

(51) Int. Cl.
*G11B 20/00* (2006.01)
*G11B 11/00* (2006.01)

(52) U.S. Cl.
USPC ...................................... 369/53.44; 369/53.36

(58) Field of Classification Search
USPC ........................................... 369/53.44, 53.36
See application file for complete search history.

(56) References Cited

U.S. PATENT DOCUMENTS

| | | | |
|---|---|---|---|
| 6,400,659 | B1 | 6/2002 | Kitaoka |
| 7,835,242 | B2 | 11/2010 | Nakayama |
| 7,885,148 | B2 | 2/2011 | Ikeda |
| 2002/0130188 | A1 | 9/2002 | Scholtysik |
| 2005/0191105 | A1 | 9/2005 | Narusawa |
| 2006/0095647 | A1 | 5/2006 | Battaglia et al. |
| 2008/0044925 | A1 | 2/2008 | Isojima et al. |
| 2009/0046552 | A1* | 2/2009 | Tsukada ..................... 369/53.17 |
| 2010/0080097 | A1 | 4/2010 | Nakamae |
| 2012/0243050 | A1 | 9/2012 | Maeshima |

FOREIGN PATENT DOCUMENTS

| | | |
|---|---|---|
| EP | 1 865 501 A1 | 12/2007 |
| JP | 04-372768 A | 12/1992 |
| JP | 06-162593 A | 6/1994 |
| JP | 2006202379 A | 8/2006 |

(Continued)

OTHER PUBLICATIONS

Standard ECMA-379, 3rd Edition, Test Method for the Estimation of the Archival Lifetime of Optical Media. Geneva, Switzerland. Jun. 2010. http://www.ecma-international.org/publications/files/ECMA-ST/ECMA-379.pdf. Last Accessed Jul. 18, 2012.

(Continued)

*Primary Examiner* — Aneeta Yodichkas
(74) *Attorney, Agent, or Firm* — Nutter McClennen & Fish LLP; John J. Penny, Jr.; Michael P. Visconti, III (57) ABSTRACT

A media processing system that produces discs with assured quality suited to long-term data storage. A data write unit writes data on a recording surface of a disc. A label print unit prints on the label side of the disc. An error rate measurement unit measures the error rate of the disc D after writing data is completed. An error rate evaluation unit determines if the media error rate measured by the error rate measurement unit is less than or equal to a preset threshold value. When the error rate evaluation unit determines that the media error rate is less than or equal to the threshold value, the label print unit prints a label image on the label side.

16 Claims, 5 Drawing Sheets

(56) References Cited

FOREIGN PATENT DOCUMENTS

| JP | 2007-014916 A | 1/2007 |
|----|---------------|--------|
| JP | 2007/149161 A | 6/2007 |
| WO | 89/06428 A1 | 7/1989 |
| WO | 2007-000707 A2 | 1/2007 |

OTHER PUBLICATIONS

Davies, Cdr Recording Failure—Find Out the Real Reasons. Articlesbase Free Online Articles Directory. Nov. 11, 2010. http://www.articlesbase.com/hardware-articles/cdr-recording-failure-find-out-the-real-reasons-3648110.html. Last Accessed Jul. 19, 2012.

* cited by examiner

WHEN COMPARISON PROCESS FAILS

FIG. 3B

WHEN VIRUS DETECTED

FIG. 3C

IF ERROR RATE EXCEEDS THRESHOLD

MEDIA PROCESSING SYSTEM, CONTROL METHOD FOR MEDIA PROCESSING SYSTEM, AND MEDIA PROCESSING DEVICE

Priority is claimed under 35 U.S.C. §119 to Japanese Application No. 2011-055600 filed on Mar. 14, 2011, which is hereby incorporated by reference in its entirety.

BACKGROUND

1. Technical Field

The present invention relates to a media processing system capable of writing data to media and printing on the label side of the media, to a control method for the media processing system, and to a media processing device.

2. Related Art

Media processing devices that write data and print labels on media such as CDs and DVDs (optical media) are known from the literature. Such media processing devices supply (transport) one blank disc from a supply stacker storing multiple blank discs to a media drive whereby data is written to the disc, then supply the disc to which data was written to an internal printer that prints on the label side, and then discharge the disc thus produced (published) to a recovery stacker. See, for example, Japanese Unexamined Patent Appl. Pub. JP-A-2006-202379.

Paper documents are increasingly digitized and recorded to CDs, DVDs, and other types of media (optical discs) for long-term storage of the digitized electronic documents. The CDs, DVDs, and other media used as the recording medium have a life expectancy of a specific time (approximately several decades) and are suited to long-term data storage. In reality, however, media deterioration is accelerated by factors such as media quality and the storage environment, and media life varies. As a result, even media that has just been produced (discs to which data was just written) could have evidence of deterioration. However, because the media processing device described above is incapable of detecting the condition of the media (degree of deterioration) during media production, the finished media could have already deteriorated, and producing media with assured quality suited to long-term storage is not possible.

SUMMARY

A media processing system, control method for a media processing system, and a media processing device according to at least one embodiment of the present invention enable producing media with assured quality suited to long-term data storage.

A media processing system according to an aspect of at least one embodiment of the invention has a data write unit that writes data on a recording surface of media; an error rate measurement unit that measures an error rate of the media after data writing by the data write unit is completed; an error rate evaluation unit that determines if the media error rate measured by the error rate measurement unit is less than or equal to a preset threshold value; and a label print unit that prints on a label side of the media, and prints a label image on the label side when the error rate evaluation unit determines that the media error rate is less than or equal to the threshold value.

Another aspect of at least one embodiment of the invention is a method of controlling a media processing system, including: a data write step that writes data on a recording surface of media; an error rate measurement step that measures an error rate of the media after data writing by the data write step is completed; an error rate evaluation step that determines if the media error rate measured by the error rate measurement step is less than or equal to a preset threshold value; and a label print step that prints a label image on the label side when the error rate evaluation step determines that the media error rate is less than or equal to the threshold value.

By measuring the media error rate after writing specific data to the media (optical disc), these aspects of the invention can evaluate the quality (degree of deterioration) of the produced media. This evaluation enables producing media with assured quality suited to long-term data storage.

In addition, by printing a label image on the label side only when the measured error rate is less than or equal to a threshold value (a preset threshold value for evaluating the error rate), the user can easily tell at a glance if the quality of the media is good or bad. More specifically, the quality of the media can be determined to be good if the label image is printed, and if the label image is not printed, the media can be determined to have deteriorated.

Note that the foregoing label image is an image input or selected by the user, and is information (such as the author, creation date, or information identifying the media) describing the content recorded to the media (data content), or an image (background image) for decorating the label side of the media, for example.

In a media processing system according to another aspect of at least one embodiment of the invention, the label print unit also prints error rate information related to the error rate measured by the error rate measurement unit on the label side when the error rate is less than or equal to the threshold value.

In a media processing system according to another aspect of at least one embodiment of the invention, the error rate information includes at least one of the maximum error rate and a graph showing the error rate.

Because error rate information is printed on the label side in these aspects of the invention, the user can easily know the error rate of each piece of media even when numerous media are produced, and media management is simplified. Furthermore, because error rate information can be printed in many different ways, different printing formats can be conveniently used according to the management standards at that time. For example, if knowing only the maximum error rate is sufficient, only the maximum error rate is printed, but if more detailed error rate information is needed, the print content can be changed according to the circumstances to print an error rate graph in addition to the maximum error rate, for example.

Note that in addition to the above, the average error rate or total number of errors could be printed as the error rate information.

In a media processing system according to another aspect of at least one embodiment of the invention, the label print unit prints information on the label side indicating that the media error rate exceeds the threshold value when the error rate detected by the error rate measurement unit exceeds the threshold value.

This aspect of the invention enables the user to know why media that was written is determined to be defective.

In a media processing system according to another aspect of at least one embodiment of the invention, when the media error rate detected by the error rate measurement unit exceeds the threshold value, the data write unit performs a repeat disc production process that writes the same data written to the error media to other unused media.

In a media processing system according to another aspect of at least one embodiment of the invention, the data write unit performs the repeat disc production process a preset number of times.

When the error rate exceeds the threshold value, that is, when media production fails, these aspects of the invention can produce media again using the same data. In addition, by repeating the media production process a specific number of times, the probability of producing good media (media to which the data is written normally) can be improved. In addition, by setting the number of times the media production process repeats, media (unused media) waste can be reduced compared with a configuration that repeats the media production process until production is successful.

A media processing system according to another aspect of at least one embodiment of the invention further preferably also has a data storage unit that stores identification information identifying the media together with the measurement result from the error rate measurement unit.

By storing (saving) the media error rate information together with media identification information, these aspects of the invention enable easily knowing the error rate of the produced media, and enable easily and efficiently managing the media. This is particularly effective when producing a large number of media.

A media processing system according to another aspect of at least one embodiment of the invention preferably has a processing device including the above data write unit, label print unit, and error rate measurement unit; and an information processing device having the error rate evaluation unit; wherein the media processing device and the information processing device are communicatively connected.

This aspect of the invention reduces the processing load on the media processing device compared with a configuration in which all parts (functions) of the media processing system are embodied in the media processing device.

Other objects and attainments together with a fuller understanding of the invention will become apparent and appreciated by referring to the following description and claims taken in conjunction with the accompanying drawings.

DESCRIPTION OF EMBODIMENTS

Figure 1:
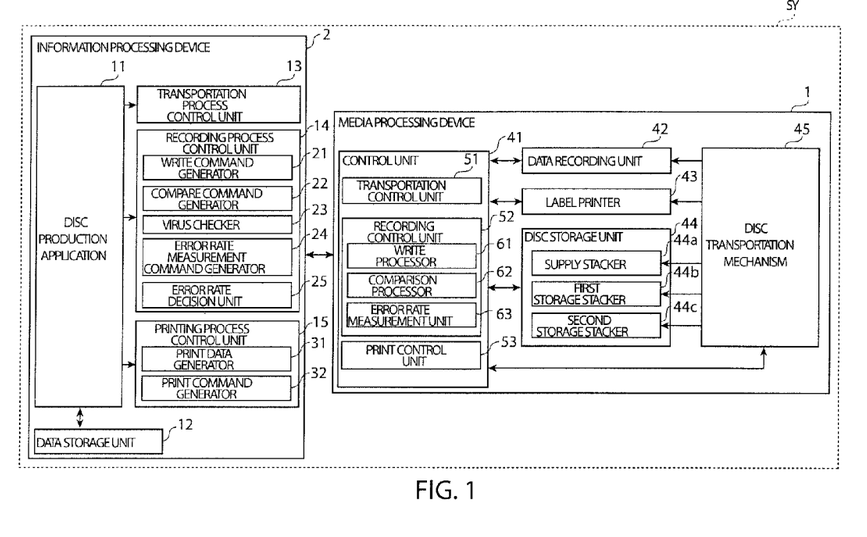
FIG. 1 is a block diagram showing the functional configuration of a media processing system according to an embodiment of the invention.

Preferred embodiments of a media processing system and preferred embodiments of a method of controlling a media processing system according to the present invention are described below with reference to the accompanying figures. FIG. 1 is a block diagram showing the functional configuration of a media processing system SY according to this embodiment of the invention. As shown in the figure, the media processing system SY includes a media processing device 1, and an information processing device 2 that is connected to the media processing device 1 and controls the media processing device 1. The media processing device 1 writes, reads, and prints on the label side L (see FIGS. 3A-3B) of optical disc media such as CD (Compact Disc), DVD (Digital Versatile Disc), and BD (Blu-ray Disc) media (below simply discs D (see FIGS. 3A-3C).

The information processing device 2 can be a common personal computer, microprocessor or server, for example, and primarily includes a disc production application 11, data storage unit 12, transportation process control unit 13, recording process control unit 14, and printing process control unit 15.

The disc production application 11 is an application for selecting the data to write on the recording surface of the disc D or producing (or selecting) a label image (label print data) for printing on the label side L. The disc production application 11 also schedules the process for producing a disc D (disc production process, described in detail below), and controls operation of other media processing device 1 parts (described below) by instructing the transportation process control unit 13, recording process control unit 14, andprinting process control unit 15 to execute processes. Note that the disc production application 11 is executed by the CPU (not shown in the figure) of the information processing device 2.

The data storage unit 12 stores data to be written to the recording surface of the disc D, label images (such as stock images provided as sample labels, or label images created with the disc production application 11) for printing on the label side L of the disc D, and error information printed on the label side L. The data storage unit 12 also stores disc information (described below in detail) including the disc D error rate and identification information identifying the disc. Note that the error information is text information created in advance by the system developer, and comprises information related to errors that can occur during the disc D production process (when writing data).

The transportation process control unit 13 generates and sends to the media processing device 1a disc transportation command controlling the disc transportation mechanism 45 of the media processing device 1 according to the schedule produced by the disc production application 11.

The recording process control unit 14 generates and outputs commands related to the data writing process of the media processing device 1 according to the schedule produced by the disc production application 11, and includes a write command generator 21, compare command generator 22, virus checker 23, error rate measurement command generator 24, and error rate decision unit 25.

The write command generator 21 acquires specified data from the data storage unit 12, and sends a command including the data for writing on a disc D (a write command) to the media processing device 1.

The compare command generator 22 sends a command (comparison process command) to the media processing device 1 for executing a comparison process that checks whether or not data was written normally to the disc D.

The virus checker 23 performs a virus check on the data written to the disc D.

The error rate measurement command generator 24 sends a command (error rate measurement command) for measuring the disc D error rate to the media processing device 1.

The error rate decision unit 25 compares a predetermined error rate threshold with the error rate measured by the media processing device 1 (the maximum error rate), and determines if the measured error rate is less than or equal to or exceeds the threshold value.

The printing process control unit 15 generates and outputs commands related to the printing process on the label side L of the media processing device 1 according to the schedule determined by the disc production application 11, and includes a print data generator 31 and print command generator 32.

The print data generator 31 generates print data for printing on the label side L. When the disc production process succeeds (when an error does not occur during the comparison process, virus check, or error rate evaluation process), the print data generator 31 generates the print data to be printed on the label side L of the disc D (print data in a format that can be processed by the label printer 43 described below) based on the label image created (or selected) by the user and information related to the error rate measured by the media processing device 1 (the "error rate information" below). When an error occurs during the disc production process (when an error occurs during the comparison process, virus check, or error rate evaluation process), the print data generator 31 generates print data based on error information describing the error content (error information stored in the data storage unit 12).

The print command generator 32 sends the print data generated by the print data generator 31 and a command (print command) for printing to the media processing device 1.

The media processing device 1 includes a control unit 41, data recording unit 42, label printer 43, disc storage unit 44, and disc transportation mechanism 45. The media processing device 1 can be a common personal computer, microprocessor or server, for example.

The data recording unit 42 is a disc drive that writes data to the recording surface of the disc D, and reads data from the recording surface of the disc D. The label printer 43 is a printer that executes a printing process on the label side L of the disc D. Note that the label printer 43 in this embodiment of the invention has an inkjet head and prints the label side L using an inkjet method.

The disc storage unit 44 stores the discs D and has a cylindrical storage case that can store several ten discs D in a stack. In this embodiment of the invention the disc storage unit 44 includes a supply stacker 44a that stores unused discs D (discs to which the write process and printing process have not been applied (blank discs)), a first storage stacker 44b that stores the discs D for which the write process and printing process ended normally ("good discs"), and a second storage stacker 44c that stores discs D that resulted in an error during the disc D production process (discs that failed inspection, referred to below as "error discs"). Note that this stacker configuration is described for example only, and can be changed as needed.

The disc transportation mechanism 45 is a mechanism that carries discs D between the data recording unit 42, label printer 43, and disc storage unit 44, includes an arm (not shown) that holds and moves the disc D horizontally (on the x-axis), a guide (not shown) that moves the arm vertically (on the y-axis), and a drive unit (not shown) that can slide axially along the guide and rotates on the axis of the guide, and transports the disc D to different parts of the media processing device 1 by driving the drive unit.

The control unit 41 controls other parts of the media processing device 1 based on commands from the information processing device 2, and includes a transportation control unit 51, recording control unit 52, and print control unit 53.

The transportation control unit 51 controls operation of the disc transportation mechanism 45 based on disc transportation commands from the information processing device 2 (transportation process control unit 13). The print control unit 53 controls operation of the label printer 43 according to print commands from the information processing device 2 (printing process control unit 15).

The recording control unit 52 controls operation of the data recording unit 42 according to commands from the information processing device 2 (recording process control unit 14), and has a write processor 61, comparison processor 62, and error rate measurement unit 63.

The write processor 61 controls the process of writing data to the disc D based on a write command sent from the information processing device 2.

The comparison processor 62 determines if the data was written normally to the disc D by comparing data written to the disc D with the original data stored in the information processing device 2 (actual data) based on a comparison command sent from the information processing device 2.

The error rate measurement unit 63 measures the error rate of the disc D after writing data is completed based on an error rate measurement command sent from the information processing device, and sends the result to the information processing device 2. Note that a data write unit is primarily composed of the recording control unit (write processor 61) and data recording unit 42.

Figure 2:
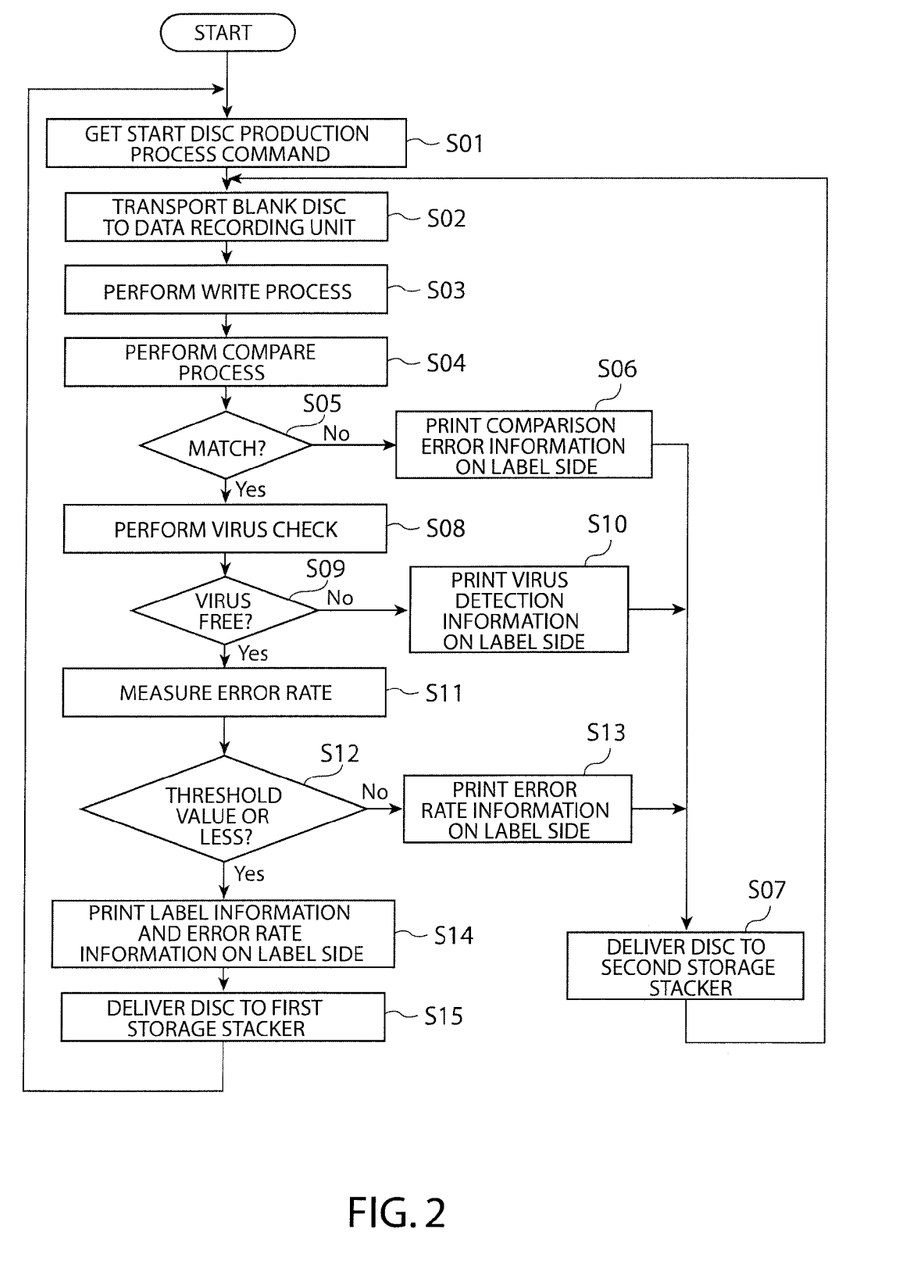
FIG. 2 is a flow chart of steps in the disc production process.
Figure 3A:
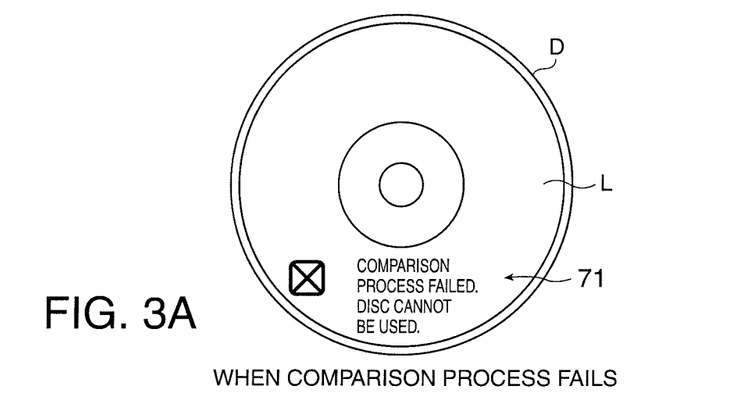
FIGS. 3A-3C show an example of the result printed on the label side during the process shown in the flow chart in FIG. 2.
Figure 3B:
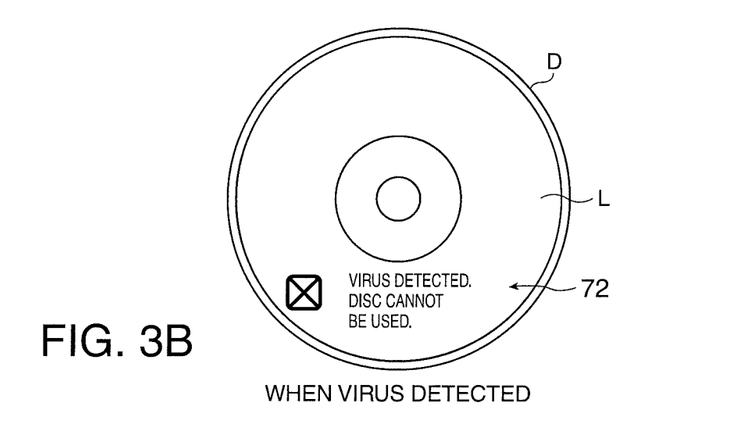
Figure 4:
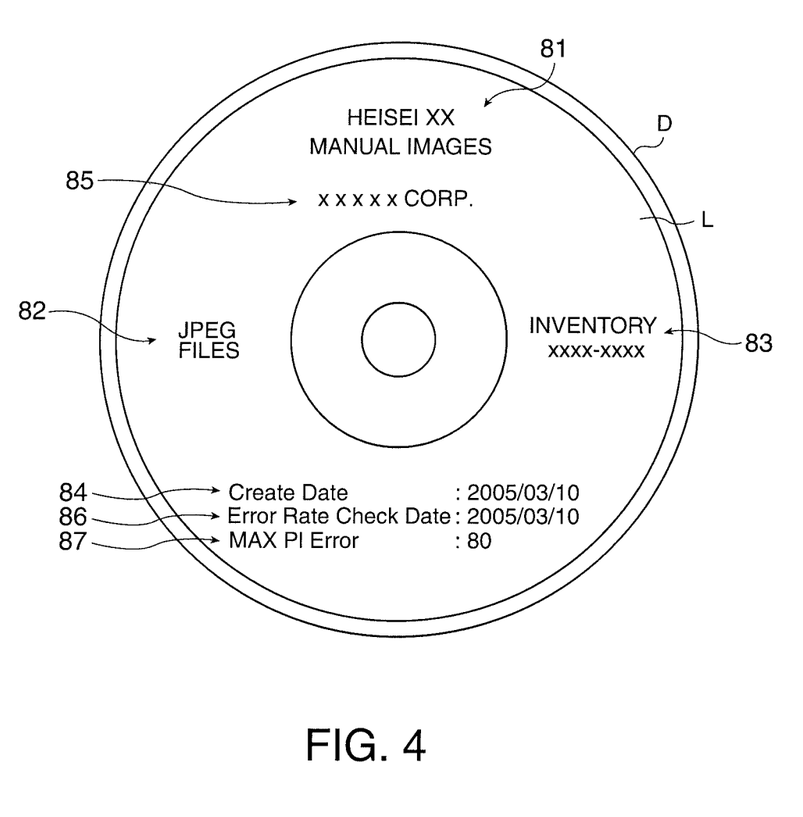
FIG. 4 shows an example of the result printed on the label side during the process shown in the flow chart in FIG. 2.

The disc production process of the media processing system SY is described next with reference to FIG. 2 to FIG. 4. FIG. 2 is a flow chart showing steps in the disc production process. FIGS. 3A-3B and FIG. 4 show the result of printing on the label side L during the process shown in the flow chart in FIG. 2. Note that the data and label image recorded on the disc D are selected in this example. The threshold value for determining the error rate is also preset.

The information processing device 2 first receives a disc production process start command by means of a user operation (S01), the information processing device 2 sends a disc transportation command to the media processing device 1, and the media processing device transports an unused disc D (blank disc) stored in the supply stacker 44a to the data recording unit 42 based on this command (S02).

The information processing device 2 then sends a write command (including the data to be written) to the media processing device 1, and the media processing device 1 controls the data recording unit 42 based on this command to write data on the disc D (S03, data write step).

After the write process ends, the information processing device 2 sends a comparison command to the media processing device 1 and the media processing device 1 performs the comparison process according to this command (SO4). The comparison is executed by reading the written data by sector unit (or all of the data) of a disc.

If the data written to the disc D and the original data (the data stored in the information processing device 2) do not match in the comparison process, that is, comparison fails (S05 returns No), the information processing device 2 sends print data indicating a comparison failure to the media processing device 1, and the media processing device 1 controls the label printer 43 to print on the label side L based on the received print data (S06). In this case, therefore, error information indicating that the comparison process failed (comparison error information 71) is printed on the label side L as shown in FIG. 3A. Based on a disc transportation command sent from the information processing device 2, the media processing device 1 then carries the disc D to the second storage stacker 44c, the error disc storage location (S07). Using the data written in S03, the disc D production process then repeats (repeat disc production process) (S02). The media processing device 1 thus performs the process to write the data written in S03 again on another unused disc. In this case (and in the repeat disc production processes described below) another disc D is automatically produced without receiving (acquiring) a disc production process start command from the user again.

If the data written to the disc D and the original data (the data stored in the information processing device 2) match in the comparison process, that is, comparison succeeds (S05 returns Yes), the information processing device 2 performs a virus check on the disc D (S08), for example by using an API service of a virus check program. If a virus is detected in this virus check (S09 returns No), the information processing device 2 sends print data describing the virus detection result to the media processing device 1, and the media processing device 1 controls the label printer 43 to print on the label side L based on the received print data (S10). In this case, therefore, error information indicating that a virus was detected (virus detection information 72) is printed on the label side L as shown in FIG. 3B. Based on a disc transportation command sent from the information processing device 2, the media processing device 1 then carries the disc D to the second storage stacker 44c, the error disc storage location (S07). Using the data written in S03, the disc D production process then repeats (repeat disc production process) (S02). Note that information such as the name of the file in which a virus was detected could also be printed in FIG. 3B. In addition, instead of using the data that was written in S03, a write command including the data in which a virus was not detected could be re-sent from the information processing device 2 to repeat the disc production process.

If a virus was not detected in the virus check (S09 returns Yes), the information processing device 2 sends an error rate measurement command to the media processing device 1, and based on this command the media processing device 1 measures the error rate of the disc D (S11, error rate measurement step). The result is sent to the information processing device 2. When the result of the error rate measurement is received from the media processing device 1, the information processing device 2 then determines if the error rate (maximum error rate) is less than or equal to the threshold value (S12 error rate evaluation step).

Figure 3C:
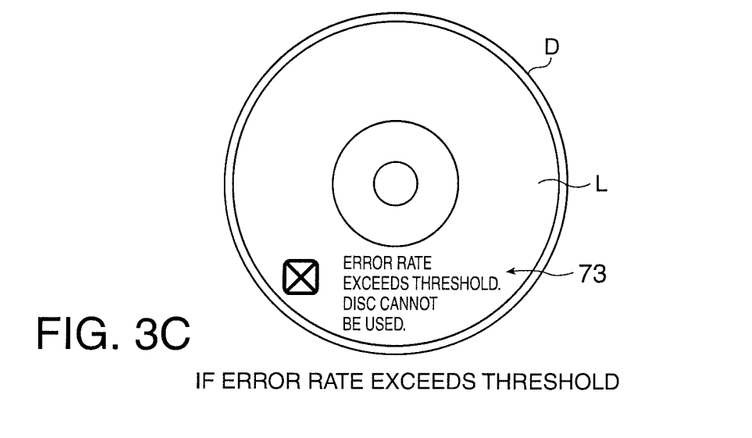

If the error rate exceeds the threshold value (S12 returns No), the information processing device 2 sends print data describing the error rate abnormality to the media processing device 1, and the media processing device 1 controls the label printer 43 to print on the label side L based on the received print data (S13). In this case, therefore, error information indicating an abnormal error rate (that the maximum error rate exceeds the threshold) (abnormal error rate information 73) is printed on the label side L as shown in FIG. 3C. Based on a disc transportation command sent from the information processing device 2, the media processing device 1 then carries the disc D to the second storage stacker 44c, the error disc storage location (S07). Using the data written in S03, the disc D production process then repeats (repeat disc production process) (S02).

If the error rate is below the threshold (S12 returns Yes), the information processing device 2 generates print data merging the error rate information based on the measured error rate received from the media processing device 1 with the label image created (or selected) by the user, sends the print data to the media processing device 1, and the media processing device 1 controls the label printer 43 to print on the label side L based on the received print data (S14, label printing step). More specifically, error rate information (the error rate check date 86 and maximum error rate 87 (such as the maximum error rate of a DVD) in the figure) is printed on the label side L in addition to the label image (the title 81, type of stored data 82, an inventory control number 83, creation date 84, and author 85 (name of producer) in the figure), as shown in FIG. 4.

The information processing device 2 could also store disc information relating the detected error rate to identification information for the disc D from which the error rate was detected in the data storage unit 12. Note that this identification information is information for identifying a disc D, and is information of the same content as the information printed on the label side L in step S14 above (that is, the content denoted by reference numerals 81 to 85). This disc information enables easily determining the error rate of the produced discs D and makes disc management easier when managing large numbers of discs D.

Based on a disc transportation command sent from the information processing device 2, the media processing device 1 then carries the disc D to the first storage stacker 44b, the location for storing good discs (S15). The media processing device 1 then performs the disc D production process for the next disc D (disc production process using the data to be written next) (S01).

Note that the production process (repeat disc production process) is performed only a specific number of times (such as 3 or 5 times) for a disc for which the comparison process, virus check, or error rate evaluation failed as described above, and if the number of times that the production process for a disc is performed reaches this limit, the repeat disc production process stops and operation goes to the next disc production process, that is, a disc production process to produce discs using the data to be written next.

As described above, the invention enables evaluating the quality (deterioration) of a produced disc D by measuring the error rate of the disc D after writing specific data to the disc D. Discs D with assured quality suited to long-term data storage can be produced as a result of this inspection process. The user can also readily determine at a glance if the quality of the produced disc D is good or bad because the label image is printed on the label side L only when the measured error rate (maximum error rate) is less than or equal to a threshold value (less than or equal to a preset error rate threshold). More specifically, the quality of the disc D can be determined to be good if the label image is printed, and if the label image is not printed, the disc D can be determined to have deteriorated (be defective).

In addition, because error rate information is printed on the label side L, the user can easily know the error rate of each disc when numerous discs D are produced, and disc management is thus simplified.

Figure 5A:
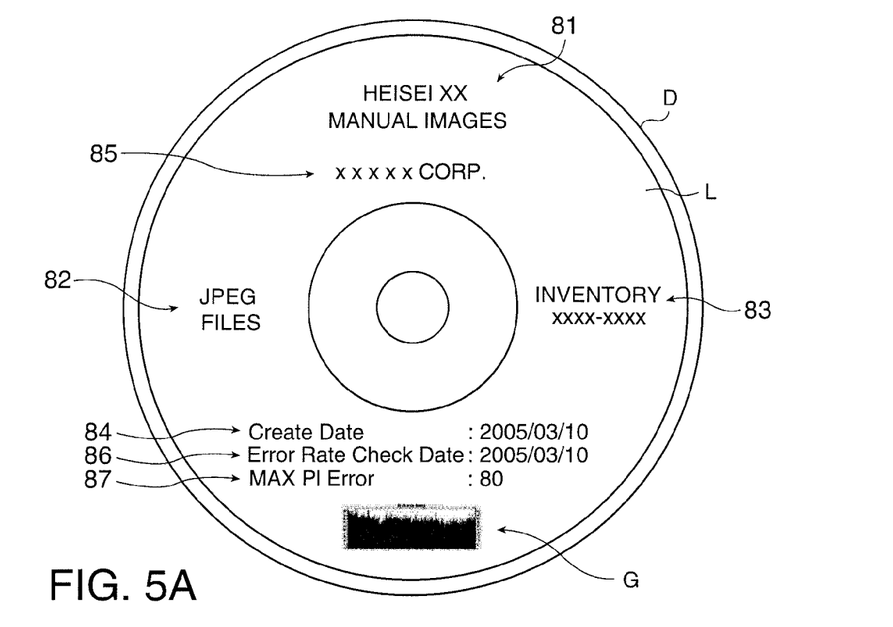
FIGS. 5A and 5B show another example of the content printed on the label side.

This embodiment prints the error rate check date 86 and maximum error rate 87 (see FIG. 4) as the error rate information on the label side L, but the invention is not so limited. For example, an error rate graph G could be printed as shown in FIG. 5A. The average error rate, the total number of errors, or the error rate threshold value could also be printed as part of the error rate information.

Figure 5B:
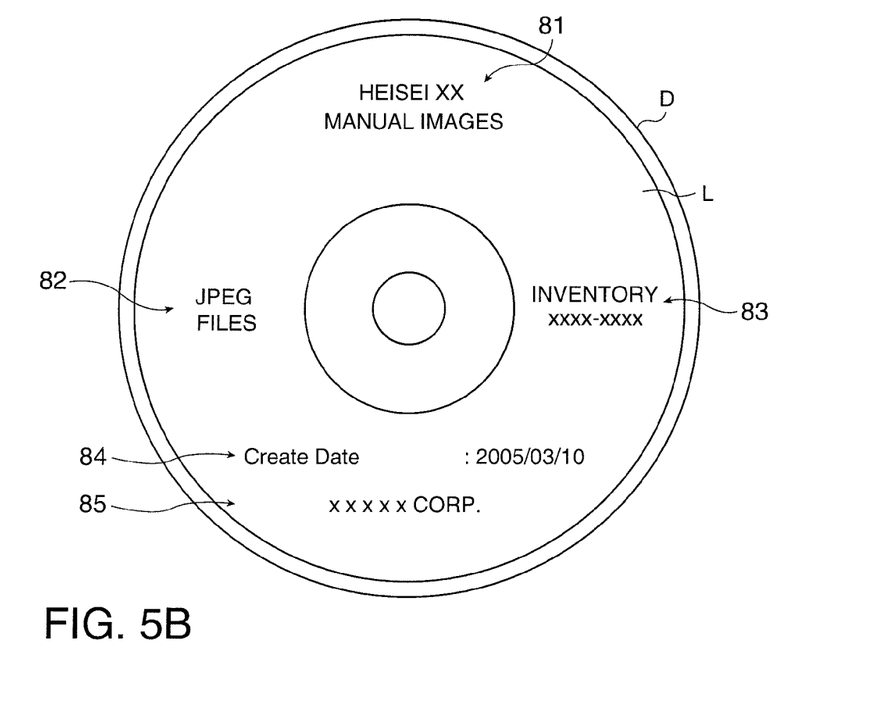

This embodiment of the invention prints error rate information in addition to the label image on the label side L (see FIG. 4) when the error rate (maximum error rate) is less than or equal to the threshold, but the invention is not so limited. For example, a configuration that prints only the label image as shown in FIG. 5B when the error rate (maximum error rate) is less than the threshold is also conceivable.

The positions where information (label image, error rate information, error information) is printed on the label side L are shown for example only in this embodiment, and the invention is not so limited. The information included in the label image (reference numerals 81 to 85) is also shown for example only, and the invention is not so limited. These attributes can be changed appropriately based on the disc production specifications.

This embodiment separately stores good discs and error discs in a first storage stacker 44*b* and second storage stacker 44*c*, respectively, but the invention is not so limited. For example, a configuration that has only one storage stacker and stores both good discs and error discs in the same stacker is also conceivable.

This embodiment applies comparison, virus check, and error rate measurement processes sequentially to the discs D after writing data, but this sequence is for example only and can be changed as desired.

This embodiment also describes the content printed on the label side L (reference numerals 81 to 85 in FIG. 4) as the disc D identification information, but the invention is not so limited. For example, any (or any combination) of the information indicated by reference numerals 81 to 85 in FIG. 4 could be used, or other information (such as an identifier assigned to each disc D) could be used. More specifically, any information that uniquely identifies a produced disc D can be used.

The media processing system SY of the invention can also be achieved by the media processing device 1 alone.

Components of the media processing system SY described above can also be rendered as a program. This program can also be provided stored on a suitable non-transitory computer-readable storage medium (not shown in the figure). The storage medium could be, for example, a CD-ROM, flash ROM, memory card (CompactFlash (R), smart media, or memory stick, for example), Compact Disc, magneto-optical disc, DVD, or floppy disk.

The invention is not limited to the foregoing embodiment, and the configuration and steps of the media processing system SY can be changed in many ways without departing from the scope of the accompanying claims.

What is claimed is:

1. A media processing system comprising:
a data write unit that writes data on a recording surface of media;
an error rate measurement unit that measures an error rate of the media after data writing by the data write unit is completed;
an error rate evaluation unit that determines if the media error rate measured by the error rate measurement unit is less than or equal to a preset threshold value; and
a label print unit that prints on a label side of the media, and prints a label image on the label side only when the error rate evaluation unit determines that the media error rate is less than or equal to the threshold value;
wherein the label print unit also prints at least one of the maximum media error rate and a graph showing the media error rate on the label side when the media error rate is less than or equal to the threshold value.

2. The media processing system of claim 1, wherein:
the label print unit prints information on the label side indicating that the media error rate exceeds the threshold value when the media error rate measured by the error rate measurement unit exceeds the threshold value.

3. The media processing system of claim 1, further comprising:
a data storage unit that stores identification information identifying the media together with the media error rate measured by the error rate measurement unit.

4. The media processing system of claim 1, comprising:
a media processing device comprising the data write unit, the label print unit, and the error rate measurement unit; and
an information processing device comprising the error rate evaluation unit;
wherein the media processing device and the information processing device are communicatively connected.

5. A media processing system comprising:
a data write unit that writes data on a recording surface of media;
an error rate measurement unit that measures an error rate of the media after data writing by the data write unit is completed;
an error rate evaluation unit that determines if the media error rate measured by the error rate measurement unit is less than or equal to a preset threshold value; and
a label print unit that prints on a label side of the media, and prints a label image on the label side only when the error rate evaluation unit determines that the media error rate is less than or equal to the threshold value;
wherein when the media error rate measured by the error rate measurement unit exceeds the threshold value, the media is error media and the data write unit automatically performs a repeat disc production process that writes the same data written to the error media to other unused media, without receiving another disc production start command from a user.

6. The media processing system of claim 5, wherein:
the data write unit performs the repeat disc production process a preset number of times.

7. A method of controlling a media processing system, comprising:
writing data on a recording surface of media;
measuring an error rate of the media after data writing is completed;
determining if the measured media error rate is less than or equal to a preset threshold value;
printing a label image on a label side of the media only when the media error rate is determined to be less than or equal to the threshold value; and
printing at least one of the maximum media error rate and a graph showing the media error rate on the label side when the media error rate is less than or equal to the threshold value.

8. The method of controlling a media processing system of claim 7, further comprising:
printing information on the label side indicating that the media error rate exceeds the threshold value when the measured media error rate exceeds the threshold value.

9. A method of controlling a media processing system, comprising:
writing data on a recording surface of media;
measuring an error rate of the media after data writing is completed;
determining if the measured media error rate is less than or equal to a preset threshold value;
printing a label image on a label side of the media only when the media error rate is determined to be less than or equal to the threshold value; and
when the measured media error rate exceeds the threshold value, automatically performing a repeat disc production process in which data that was written to the media is written to other unused media, without receiving another disc production start command from a user.

10. The method of controlling a media processing system of claim 9, wherein:
the repeat disc production process is performed a preset number of times.

11. A media processing device comprising:
a data write unit that writes data on a recording surface of media;
an error rate measurement unit that measures an error rate of the media after data writing by the data write unit is completed;
an error rate evaluation unit that determines if the media error rate measured by the error rate measurement unit is less than or equal to a preset threshold value; and
a label print unit that prints on a label side of the media, and prints a label image on the label side only when the error rate evaluation unit determines that the media error rate is less than or equal to the threshold value;
wherein the label print unit also prints at least one of the maximum media error rate and a graph showing the media error rate on the label side when the media error rate is less than or equal to the threshold value.

12. The media processing device of claim 11, wherein:
the label print unit prints information on the label side indicating that the media error rate exceeds the threshold value when the media error rate measured by the error rate measurement unit exceeds the threshold value.

13. A media processing device comprising:
a data write unit that writes data on a recording surface of media;
an error rate measurement unit that measures an error rate of the media after data writing by the data write unit is completed;
an error rate evaluation unit that determines if the media error rate measured by the error rate measurement unit is less than or equal to a preset threshold value; and
a label print unit that prints on a label side of the media, and prints a label image on the label side only when the error rate evaluation unit determines that the media error rate is less than or equal to the threshold value;
wherein when the media error rate measured by the error rate measurement unit exceeds the threshold value, the media is error media and the data write unit automatically performs a repeat disc production process that writes the same data written to the error media to other unused media, without receiving another disc production start command from a user.

14. The media processing device of claim 13, wherein:
the data write unit performs the repeat disc production process a preset number of times.

15. A media processing system comprising a microprocessor configured to:
write data on a recording surface of media;
measure an error rate of the media after data writing is completed;
determine whether the measured media error rate is less than or equal to a preset threshold value;
print on a label side of the media, and print a label image on the label side only when it is determined that the media error rate is less than or equal to the threshold value; and
print at least one of the maximum media error rate and a graph showing the media error rate on the label side when the media error rate is less than or equal to the threshold value.

16. A computer program stored on a non-transitory computer-readable storage medium, said computer program configured to control a media processing system by:
writing data on a recording surface of media;
measuring an error rate of the media after data writing is completed;
determining whether the measured media error rate is less than or equal to a preset threshold value;
printing a label image on a label side of the media only when the media error rate is determined to be less than or equal to the threshold value; and
printing at least one of the maximum media error rate and a graph showing the media error rate on the label side when the media error rate is less than or equal to the threshold value.

* * * * *